Oct. 24, 1961   L. E. GOODMAN ET AL   3,005,351
APPARATUS FOR PROVIDING ALTERNATING POWER OF VARIABLE FREQUENCY
Filed Oct. 27, 1949

INVENTORS
JOEL M. BENJAMIN, JR.
LAWRENCE E. GOODMAN
BY
ATTORNEY

United States Patent Office 3,005,351
Patented Oct. 24, 1961

3,005,351
APPARATUS FOR PROVIDING ALTERNATING POWER OF VARIABLE FREQUENCY
Lawrence E. Goodman, Urbana, Ill., and Joel M. Benjamin, Jr., Philadelphia, Pa., assignors to the United States of America as represented by the Secretary of the Navy
Filed Oct. 27, 1949, Ser. No. 123,878
7 Claims. (Cl. 74—5.6)

The present invention relates broadly to a process and apparatus for generating an electrical signal in response to the indication of a measuring instrument, such for example as a compass or a free gyroscope, and more particularly it relates to a position indicator whereby the position of the outer gimbal of a free gyroscope with respect to the stationary housing thereof may be indicated at a remote point.

Still more specifically, the invention relates to a process and apparatus for use in testing a guided missile provided with such free gyroscope, whereby the roll position of the vehicle may be indicated at a suitable receiving station, even when the vehicle is in flight and therefore inaccessible from the ground.

Heretofore there has been no entirely satisfactory way of observing the roll behavior of a guided missile while in flight. Such missiles are usually desired to be stabilized against roll, in order that guidance and control signals may be transmitted to the missiles by radio, and ordinarily such control depends on the absence of excessive roll of the missile, which obviously would have a disturbing effect on the intensity and relative direction of the radio signals. In testing missiles for roll, it has been customary to observe the missiles by optical means, such as a theodolite or a camera, or by both together.

Such optical methods are satisfactory only for relatively short ranges, and moreover are dependent on the illumination and visibility of the missile. That is, they fail in darkness and whenever the missile is obscured, as by trees, clouds and other obstacles. The present invention avoids these difficulties by providing, on the missile, an automatically controlled radio transmitter the output of which is modulated in accordance with the roll orientation of the missile, whereby a suitable receiver on the ground may continuously give information as to such orientation, even at relatively great ranges and regardless of whether or not the missile is visible at the location of said receiver.

An object of the present invention is, therefore, to provide a telemetric signaling system for transmitting information concerning the behavior of guided missiles during flight, and specifically, to provide an improved roll position indicator.

Another important object is to provide a position indicator which is rugged and compact, and does not withdraw energy from the gyroscope.

A further object is to provide a frequency modulated transmitter system for a guided missile, wherein variation of an operating characteristic of the missile manifests itself as a change in the transmitter frequency.

A specific object is to provide an oscillator including an inductance in its circuit, so designed that a variation in a condition to be indicated produces a corresponding change in the said inductance, which in turn causes a change in the frequency of the oscillations.

Other objects and many of the attendant advantages of this invention will be appreciated readily as the same becomes understood by reference to the following detailed description, when considered in connection with the accompanying drawings, wherein.

Figure 1:
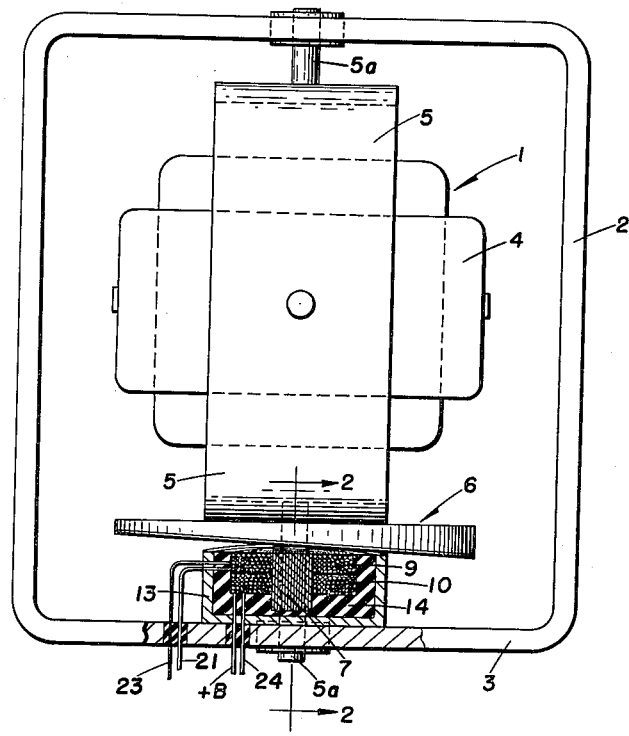
FIG. 1 is an elevation of a gyroscope having variable-inductance electrical windings associated therewith, said windings and the coacting magnetic core structure being shown in section.

Referring first to FIG. 1, there is illustrated a gyroscope 1, which is mounted in an outer frame 2 having a bottom wall 3. The details of the gyroscope itself form no part of the present invention, and therefore are not shown or described herein. The gyroscope is pivoted to the inner gimbal 4 which in turn is pivoted to the outer gimbal 5, the outer gimbal itself being pivotally mounted in the frame 2, all in any suitable way.

Figure 2:
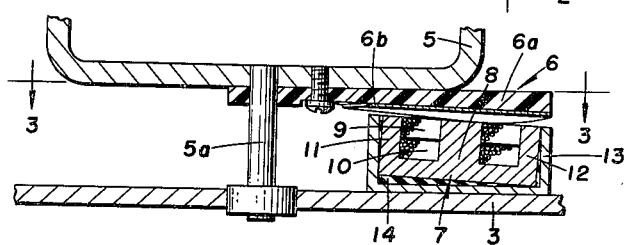
FIG. 2 is a detail fragmentary section on the plane 2—2 of FIG. 1.

Carried by the wall 3 is an electromagnetic structure that comprises a laminated or otherwise subdivided core 7 of magnetic material, illustrated in FIG. 2 as built up of E-shaped laminations. These laminations when assembled form a central leg 8 that is approximately square in cross section. This leg is surrounded by two coils or windings 9 and 10 which fit snugly over said leg 8 and between the two outer legs 11 and 12 of the structure. Preferably, a protective shell 13 receives the core and windings to secure the same rigidly in position on the wall 3. As shown in FIG. 2, the laminated core 7 is mounted to cause the pole faces thereof to slope slightly downward toward the front of wall 3, for a purpose that will be explained hereinafter. A suitable potting compound 14 may be provided to hold the core and windings in the shell 13 and also protect them against moisture and mechanical injury.

It will be noted that the E-shaped core constitutes an open magnetic circuit, and that therefore additional magnetic material is required to close said circuit. This is provided here by the movable sector-shaped vane 6, which is attached to the outer gimbal 5 to rotate therewith. The vane 6 is shown as a sector of a circle, centered at the shaft 5a of gimbal 5, and preferably of sufficiently large radius to extend slightly beyond the E-shaped core. The vane 6 may consist suitably of an upper part 6a of non-magnetic material provided underneath with a layer 6b of magnetic material, preferably one of high permeability, such as Mu-metal or Permalloy. As illustrated, the upper surface of the part 6a is a plane normal to the shaft 5a, whereas its lower surface is inclined slightly to said normal, thus providing a wedge-shaped element.

Figure 3:
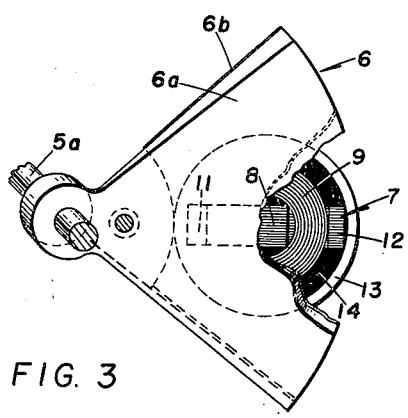
FIG. 3 is a detail plan of an arcuate vane carrying magnetic material forming part of the inductance-varying means, said vane being partly broken away to show the core and windings therebeneath.

In order to provide variation of the inductance of the coils 9 and 10, the movable magnetic material is so related to the fixed core of the magnetic circuit that it may be variably spaced from said core, that is, so that a variable air gap is provided in the magnetic circuit. This is accomplished most simply by locating the lower surface of the sector shaped vane 6 at a slight angle to the plane normal to the shaft 5a of the outer gimbal 5, so that the magnetic material thus is not parallel to the plane of the ends of the core 7, and approximates a portion of a helicoidal surface. This is the reason the part 6a is made wedge-shaped, as described above, as it thus becomes possible to secure the proper location of the layer 6b merely by securing a flat piece of the magnetic material against the lower plane surface of the part 6a. Thereby, on turning of the sector shaped vane 6, the spacing between the core and the magnetic element 6b will vary in accordance with the angle of turn, and hence the reluctance of the magnetic circuit will also vary with said angle. The inclination of the pole faces of the core 7, already mentioned, is preferably such that said pole faces are approximately parallel to the adjacent portion of the magnetic material 6b when the vane 6 is at the middle of its deflection range, that is in the position shown in FIG. 3.

Inasmuch as the inductance of each winding, as well as their mutual inductance, depends on the magnetic flux and hence on the reluctance, it is obvious that turning of the sector 6 will provide variation of all said inductances. This makes it possible to provide variable-frequency oscillations in a very simple way. To accomplish this, the coils 9 and 10 are connected into the circuits of an oscillation generator, such as the Hartley oscillator shown in FIG. 4.

Figure 4:
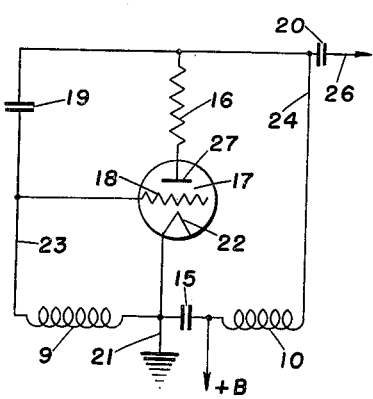
FIG. 4 is a circuit diagram showing how the device may be connected with an electron discharge tube to constitute a variable frequency oscillator.

In said FIG. 4, the oscillator is based on a triode 17. The coil 9 is connected at one end to conductor 21 and thus to the cathode 22, and at its other end through conductor 23 to the grid 18. The other coil 10 is connected at one end to conductor 21 through an isolating capacitor 15 and at its other end is connected to the anode 27 through conductor 24 and a protective resistor 16. An additional capacitor 19 may be connected in parallel with the inherent grid-anode capacitance of the triode to adjust the total capacitance in the circuit, to provide a desired frequency range. The capacitance 15 is large enough to oppose only a relatively low impedance to the oscillations. The output of the oscillator is delivered through capacitor 20, by conductor 26, and may be radiated directly or further amplified as may be necessary.

It will be evident from FIGS. 1 and 4 that the oscillator comprises two closely-coupled coils 9 and 10, of variable individual and mutual inductances, and that consequently the oscillator will yield a frequency that depends on the angular position of the sector 6 with respect to the core 7. It will also be understood that while a laminated core has been disclosed, other known types of subdivided core may be used if preferred, such as those made of comminuted iron held by a suitable binder and molded into a desired shape.

The operation of the device will be understood from the structure and circuits thereof. Briefly, when the gimbal 5 turns in response to a change of direction of the missile or other vehicle, the sector 6 will turn with it and by reason of the inclination of its facing of magnetic material 6b, the air gap between said facing and the core 7 will vary.

Due to the changed inductances thus produced in both windings 9 and 10, which constitute the grid and anode coils of a Hartley oscillator, the frequency of the oscillations generated by said oscillator will vary accordingly. The output of the oscillator may be transmitted to a suitable receiver on the ground either directly through an antenna, or as modulation of a carrier provided by some other source.

In actual practice, the apparatus has performed well to indicate roll up to 20° in either direction from the horizontal, with an accuracy within ½ degree and its indications are linear to within 1 degree over this range.

An important advantage of the device is that it draws no power from the gyroscope. This is important because the relatively small gyroscopes used in test missiles will precess at the rate of approximately 0.1° per minute per gram-centimeter of restraining torque applied to the outer gimbal.

The device is also very simple, rugged and compact. The variable-frequency signal it produces may constitute one of the channels of a multiple-channel telemetric signaling system applicable to test missiles.

Obviously many modifications and variations of the present invention are possible in the light of the above teachings. It is therefore to be understood that within the scope of the appended claims the invention may be practised otherwise than as specifically described.

What is claimed is:

1. In apparatus for providing alternating power of variable frequency, having a variable frequency oscillator with a grid coil and an anode coil, in combination, means providing magnetic coupling between said coils, said means including a core of magnetic material having pole faces located substantially in a plane, a vane of magnetic material pivoted adjacent said pole faces on an axis normal to said plane but inclined to the axis of its pivot whereby the air gap between the vane and said pole faces varies upon relative rotation between the core and the vane, and a direction-responsive device connected to the vane to stabilize the said vane in respect to its pivot.

2. Means for varying the inductance of parts of apparatus for providing alternating power of variable frequency, said means comprising a mass of magnetic material having a channel open at a plane face of said mass, two coils seated in said channel, a vane of magnetic material spaced from and overhanging said plane face, and a shaft carrying said vane, the plane of the vane being inclined to a plane normal to the shaft.

3. In a roll position indicator having a free gyroscope, and a gimbal mounting for said gyroscope; in combination, an oscillator control including a vane of magnetic material fixed on said gimbal mounting, said vane being slightly inclined with respect to a plane normal to the axis of the gyroscope, an open magnetic core mounted adjacent to said vane in a plane normal to the axis of the gyroscope said vane completing the magnetic circuit of said core, a plurality of oscillator control windings interlinked with said core, angular displacement of said core along said inclined face changing the magnetic reluctance of said core and varying the inductance of said windings.

4. In apparatus for varying the frequency of an oscillator in response to the roll of a vehicle in flight, including a free gyroscope, a grid coil and an anode coil for said oscillator, an open magnetic core interlinking said coils, said core being fixed to said vehicle with its open side substantially in a plane normal to an axis of a free gyroscope; in combination, a vane carried by said gyroscope, said vane having a surface in closely spaced relation to the open side of said core, the other surface of said vane being shaped to approximate a helicoidal surface inclined with respect to a plane normal to the axis of the gyroscope whereby roll of said vehicle changes the air gap of said core and varies the coupling between said coils.

5. In an oscillator control system including a plurality of oscillator windings, an open magnetic core interlinking said windings, and a free gyroscope; the combination with a vane of magnetic material fixed in direction by said gyroscope, the face of said vane being inclined with respect to a plane normal to the axis of the gyroscope, said open core being fixed adjacent said vane, angular displacement between said vane and said core varying the reluctance of said core to vary the inductance of said winding.

6. In apparatus for indicating the angular roll of a missile in flight having a free gyroscope mounted in said missile; in combination, an oscillator control including a vane of magnetic material fixed to said gyroscope, an open magnetic core fixed to said missile in proximity with said vane, said vane having the face adjacent the core inclined so that roll of said missile produces angular displacement of said core along the inclined face of said vane to vary the magnetic reluctance of said core and an oscillator winding linked with said core.

7. In apparatus for varying the frequency of an oscillator in response to the angular displacement of a body with respect to a free gyroscope, said oscillator having a plurality of winding elements; in combination, an open magnetic core interlinked with said windings, an armature fixed in relation to space by said gyroscope, the face of said armature being inclined with respect to the plane of displacement, said core being secured adjacent said armature whereby angular movement of said body with respect to said gyroscope varies the inductance of said winding elements.

References Cited in the file of this patent

UNITED STATES PATENTS

| | | |
|---|---|---|
| 2,292,798 | Roberts | Aug. 11, 1942 |
| 2,304,095 | Hull | Dec. 8, 1942 |
| 2,334,018 | Mayne | Nov. 9, 1943 |
| 2,484,022 | Esval | Oct. 11, 1949 |
| 2,493,015 | Newton | Jan. 3, 1950 |